(12) United States Patent
Grosspietsch et al.

(10) Patent No.: US 6,702,084 B2
(45) Date of Patent: *Mar. 9, 2004

(54) CLUTCH OPERATOR ARRANGEMENT

(75) Inventors: Wolfgang Grosspietsch, Schweinfurt (DE); Angelika Ebert, Schweinfurt (DE); Markus Heiartz, Schweinfurt (DE); Wolfgang Reisser, Sennfeld (DE); Andreas Dau, Würzburg (DE); Paul Kraus, Niederwerrn (DE); Thomas John, Sulzheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/909,339

(22) Filed: Jul. 19, 2001

(65) Prior Publication Data

US 2002/0074206 A1 Jun. 20, 2002

(30) Foreign Application Priority Data

Jul. 21, 2000 (DE) .......................................... 100 35 516

(51) Int. Cl.[7] .............................................. F16D 13/22
(52) U.S. Cl. ........................ 192/94; 192/98; 74/424.82
(58) Field of Search ........................ 192/94, 98, 110 B; 74/424.82, 89.23, 424.81

(56) References Cited

U.S. PATENT DOCUMENTS

| 3,507,374 | A | * | 4/1970 | Allaben ..................... 192/41 R |
| 3,904,004 | A | * | 9/1975 | Marx ......................... 192/84.7 |
| 4,080,011 | A | * | 3/1978 | Wilke et al. .................. 384/45 |
| 4,739,867 | A | * | 4/1988 | Harrington .................... 192/98 |
| 4,936,428 | A | * | 6/1990 | Leigh-Monstevens et al. ........................... 477/87 |
| 5,141,091 | A | | 8/1992 | Perez et al. |
| 5,150,778 | A | * | 9/1992 | Wolbers et al. ............... 192/98 |
| 5,749,265 | A | * | 5/1998 | Namimatsu et al. ...... 192/93 A |
| 6,167,997 | B1 | * | 1/2001 | Keeney ....................... 192/40 |

FOREIGN PATENT DOCUMENTS

| DE | 195 47 081 | 6/1996 | ........... F16D/13/75 |
| EP | 0 478 427 | 4/1992 | ........... F16D/23/12 |

* cited by examiner

Primary Examiner—Saul Rodriquez
Assistant Examiner—Eric M. Williams
(74) Attorney, Agent, or Firm—Cohen, Pontani, Lieberman & Pavane

(57) ABSTRACT

A clutch operator arrangement for introducing an actuating force into a friction clutch includes a ball screw arrangement.

10 Claims, 6 Drawing Sheets

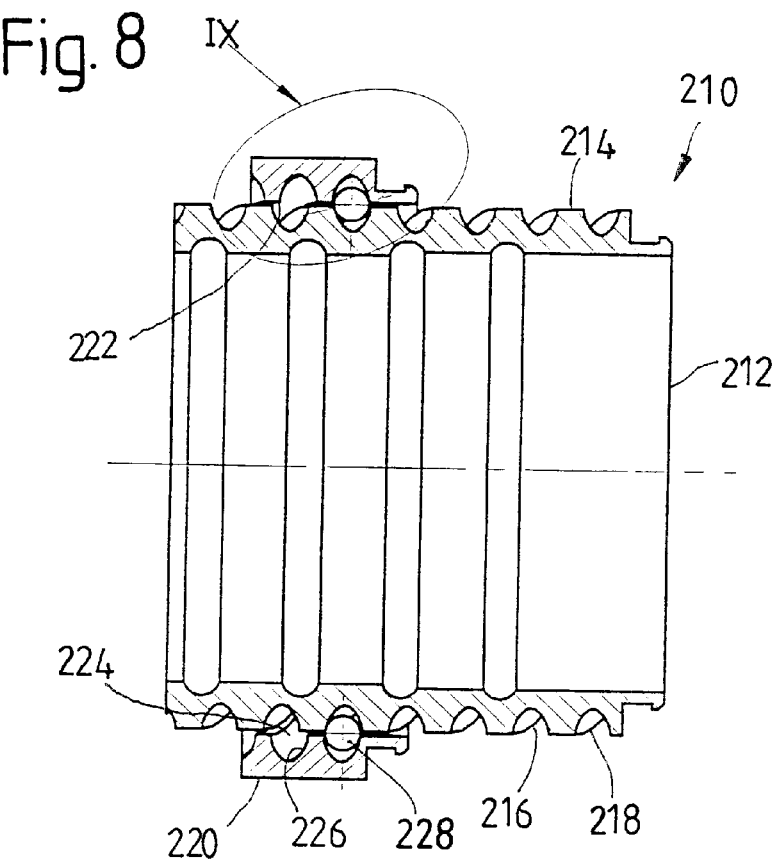
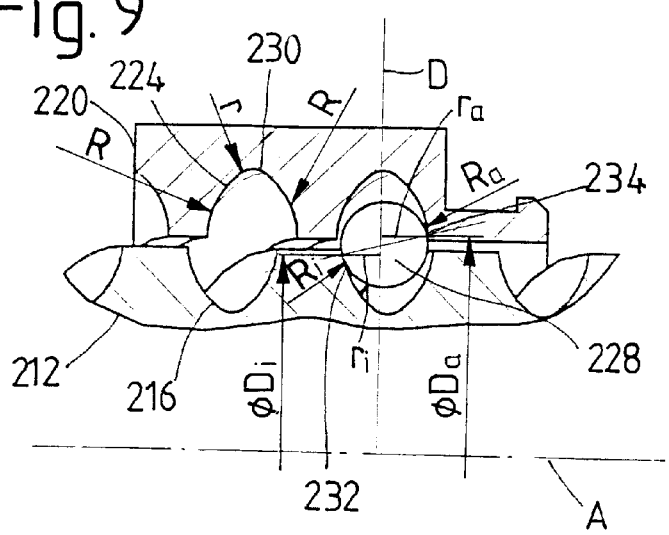

CLUTCH OPERATOR ARRANGEMENT

BACKGROUND OF THE INVENTION

1. Field of the Invention

The present invention relates to a clutch operator arrangement for introducing an actuating force into a friction clutch.

2. Description of the Related Art

DE 195 47 081 A1 has disclosed an actuating device for a clutch, in which a clutch operator arrangement has two ramp regions which can rotate with respect to one another about an axis of rotation, follow one another in the axial direction and between which rolling bodies designed in the form of balls are positioned. If one of the components which have ramp surfaces is driven in rotation, for example by being driven by a Bowden cable, the ramp surfaces which lie axially opposite one another move, with a rolling movement of the balls, with the result that the two components are shifted axially with respect to one another and a clutch release force is generated.

EP 0 478 427 A1 also discloses an arrangement of this type, in which associated groups of ramp surfaces, with dedicated ball elements between them, can move with respect to one another in order to generate the axial thrust force.

One drawback of these known clutch operator mechanisms which operate using pairs of ramp surfaces which lie opposite one another is that, on account of the ramp surface pairings which follow one another in the circumferential direction, the circumferential angle sector over which ramp surfaces of this nature can extend is restricted, primarily also because a plurality of ball elements of this nature have to be distributed in the circumferential direction in order to achieve uniform axial force transmission or generation. To generate a predetermined axial movement on the output side, therefore, a relatively large ramp pitch is required, and this in turn requires relatively high input forces in order ultimately to be able to work against the force of a force accumulator.

Furthermore, clutch operator mechanisms which operate, for example, with a clutch release lever or with piston/cylinder systems arranged concentrically with respect to the axis of rotation are known, but these systems are comparatively large and often undesirable.

SUMMARY OF THE INVENTION

The object of the present invention is to provide a clutch operator arrangement which, while being of small overall size and of simple structural design, is able to generate high actuating forces.

According to the invention, this object is achieved by the fact that the clutch operator arrangement comprises a ball screw arrangement.

Ball screws are used, for example, in machine tools in order to convert rotary movements into linear translation movements. The present invention makes use of the fact that, ultimately, the ball screws do not have the rotation angle limitation which is present in the prior art. It is therefore possible, even with a relatively small input force, to generate relatively high actuating forces, by means of which the force accumulators used in friction clutches, such as for example diaphragm springs, can be acted on and actuated. A further significant advantage of ball screws of this type is that they are able to transmit forces in both axial directions, so that they can be used with both pulled and pushed clutches, without having to make design changes to the basic structure of the region which converts the rotational movement into the translational movement.

By way of example, it is possible to provide for the ball screw arrangement to comprise a spindle element, which on an outer circumferential surface has a first groove arrangement, a nut element, which surrounds the spindle element and on its inner circumferential surface has a second groove arrangement, a plurality of ball elements, at least some of which engage in the first groove arrangement and the second groove arrangement, the spindle element being rotatable about an axis of rotation with respect to the nut element and, in the event of rotation of the spindle element with respect to the nut element about the axis of rotation, the ball elements which engage in the first groove arrangement and the second groove arrangement, by rotating about a respective ball axis of rotation, rolling along the first groove arrangement and the second groove arrangement, and for one element out of the nut element and the spindle element to be or be able to be supported on a substantially stationary assembly, the friction clutch to be or be able to be acted on by the other element out of the nut element and spindle element, and at least one element out of the nut element and the spindle element to be able to be driven to rotate about the axis of rotation, in order to produce a relative displacement between the spindle element and the nut element in the direction of the axis of rotation.

According to a first alternative design variant, a drive arrangement which engages on that element out of the nut element and the spindle element which is intended to act on the friction clutch, in order to set this element in rotation about the axis of rotation, may be provided for the purpose of generating the translational movement.

Such a design variant of the drive arrangement may, for example, be provided if the spindle element is fixed, on the substantially stationary assembly, against rotation about the axis of rotation and movement in the direction of the axis of rotation, and if the nut element can be driven to rotate about the axis of rotation by means of the drive arrangement.

Since, in an arrangement of this type, the drive arrangement ultimately engages on the element which moves in translation in the axial direction, i.e. the nut element, it is necessary to ensure that the drive arrangement is also able to follow this translational movement. In an embodiment which is very simple to implement, it is possible to provide for the drive arrangement to comprise a cable pull element which engages on the nut element. Alternatively, however, it is possible for the drive arrangement to comprise a drive slide element, preferably a drive lever element, which interacts with the nut element for rotational movement driving in an interaction region.

In a further alternative design variant of the clutch operator arrangement according to the invention, it is possible to provide a drive arrangement which engages on that element out of the nut element and the spindle element which is intended to be supported on the substantially stationary assembly, in order to set this element in rotation about the axis of rotation. This variant has the advantage that the drive arrangement, through interaction with an assembly which is substantially stationary in the axial direction, does not have to follow a translational movement. In an embodiment of this nature it is possible, for example, to provide for the spindle element to be mounted on the substantially stationary assembly so as to rotate about the axis of rotation, while it substantially cannot be displaced in the direction of the axis of rotation, and for the nut element to be held in such a way that it can be displaced in the direction of the axis of rotation but substantially cannot rotate about the axis of rotation. To prevent the nut element from also executing a corresponding rotational movement in the event of rotation of the spindle element, it is furthermore possible to provide a rotational-movement blocking arrangement, by means of which the nut element is connected to the substantially stationary assembly in such a manner that it can move in the axial direction and is stopped from rotating about the axis of rotation.

In this embodiment, the drive arrangement may have a toothed element, preferably a rack element, which meshes with mating toothing, preferably outer circumference toothing, provided on the spindle element.

Furthermore, the ball screw arrangement according to the invention is preferably designed in such a manner that the first groove arrangement has at least one first thread, preferably with a plurality of turns, that the second groove arrangement has at least one second thread assigned to each first thread of the first groove arrangement, the at least one second thread preferably having at least one turn, the turn end regions of which are connected to one another via a ball-return section.

In order to minimize the frictional forces which occur when carrying out an actuating movement, it is proposed for the other element out of the nut element and the spindle element to engage on the friction clutch, preferably a force accumulator thereof, by means of a bearing arrangement.

As has already been stated above, it is possible, depending on whether use with a pulled clutch or with a pushed clutch is desired, for the other element to act on the friction clutch with an actuating force which is directed substantially away from the stationary assembly or to act on the friction clutch with an actuating force which is directed substantially toward the stationary assembly. In this case, there is preferably also an action element which, based on the direction of the actuating force, engages behind an element which is acted upon, preferably a force accumulator, of the friction clutch and is releasably coupled to the other element out of the nut element and the spindle element. In this way, it is ensured that even producing the pulling interaction between the other element out of the nut element and the spindle element and, for example, the force accumulator can be achieved in a simple way, yet at the same time it is possible to dismantle the system, for example in order to carry out maintenance work.

As has already been mentioned above, it is an object, with actuating systems of this type, in which it is necessary to work against relatively high forces, to keep the friction losses occurring in the system itself as low as possible. An inherent characteristic of ball screws is that the ball elements which serve to transmit force interact with the spindle element and the nut element at regions of these elements which are at different radial distances from the axis of rotation. The result is that, for a predetermined rotation angle of the ball elements about their associated ball axes of rotation, the ball elements on the element which lies further toward the outside, namely the nut element, which has a longer rolling path, would have to move further than on the rolling path of the spindle element. In reality, in use this ultimately leads to the balls slipping in places, with corresponding friction losses. To counteract this problem, it is proposed for, based on the ball axes of rotation, an effective ball-rolling radius with which the ball elements roll along the first groove arrangement to be smaller than an effective ball-rolling radius with which the ball elements roll along the second groove arrangement.

The provision of a smaller effective ball-rolling radius for interaction with the first groove arrangement, i.e. the groove arrangement provided on the spindle element, now ensures that, when the balls are executing a rotary movement about their associated ball axes of rotation, they can actually cover a shorter rolling distance on the first groove arrangement than on the second groove arrangement. In this way, it is possible to substantially avoid the occurrence of sliding friction in the region of these surface regions which interact by rolling.

By way of example, it is possible to provide for the ball elements to be able to roll along a first rolling-surface region of the first groove arrangement and a second rolling-surface region of the second groove arrangement, while rotating about the respective ball axis of rotation, and for, at least during the rolling movement, the ball elements to be in contact with the first rolling-surface region by means of a first ball-surface region which is at a shorter distance from the ball axis of rotation than a second ball-surface region, by means of which the ball elements are in contact with the second rolling-surface region at least during the rolling movement.

To be able to achieve this different manner of interaction between the ball elements and the different groove arrangements, it is proposed, for example, for the first groove arrangement to have a groove cross-sectional profile with a first surface curvature radius in the region of the first rolling-surface region, for the second groove arrangement to have a groove cross-sectional profile with a second surface curvature radius in the region of the second rolling-surface region, and for the first surface curvature radius to be smaller than the second surface curvature radius. Furthermore, it is possible for the first groove arrangement and the second groove arrangement to have a respective groove cross-sectional profile with a surface curvature radius which decreases from an opening region toward a groove base.

According to a further preferred embodiment of the clutch operator arrangement according to the invention, it is possible to provide for the surface curvature radius of the first groove arrangement and/or the surface curvature radius of the second groove arrangement in the region of the groove base to be smaller than the radius of the ball elements. In this way, it is ensured that, irrespective of the state of load, the ball elements cannot reach the base of the groove. The result is that in the region of the groove base there is a region of the volume of the groove arrangements which is never used by the ball elements, so that dust which ultimately collects in this region cannot contribute to any significant deterioration in the rolling properties.

The present invention also relates to a friction clutch in which a clutch operator arrangement according to the invention is provided. Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 8 is a partial longitudinal sectional view through a clutch operator arrangement according to the invention;

FIG. 9 shows on an enlarged scale the detail denoted by IX in FIG. 8; and

DETAILED DESCRIPTION OF THE PRESENTLY PREFERRED EMBODIMENTS

Figure 1:
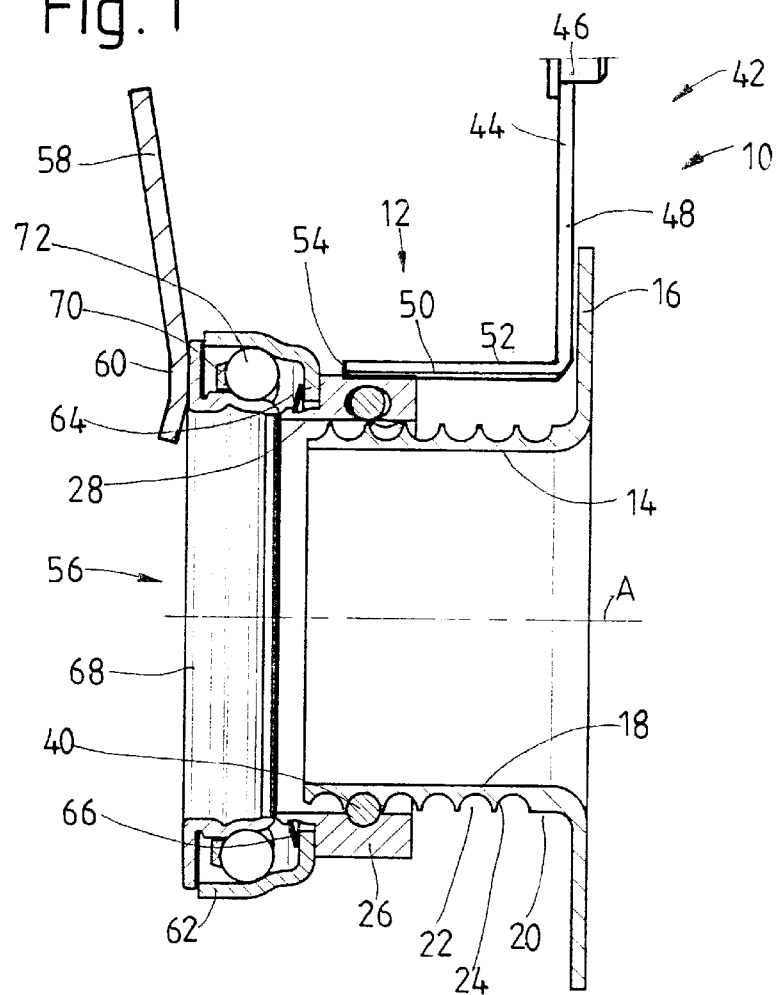
FIG. 1 is a longitudinal sectional view of a clutch operator arrangement according to the invention.

A first embodiment of a clutch operator arrangement according to the invention is illustrated in FIGS. 1 to 4. The clutch operator arrangement 10 according to the invention comprises a ball screw or spindle drive, which is denoted overall by 12. This ball screw 12 has a spindle element 14, which in this case is of substantially sleeve-like design, can be fixed by means of a flange-like section 16, which extends substantially radially outward, to a substantially stationary assembly, for example a transmission casing, and which has a first groove arrangement 22 on an outer circumferential surface 20 in an approximately cylindrical section 18 which extends substantially in the axial direction. In the exemplary embodiment illustrated, this groove arrangement 22 comprises a thread 24 with a plurality of turns.

Figure 2:
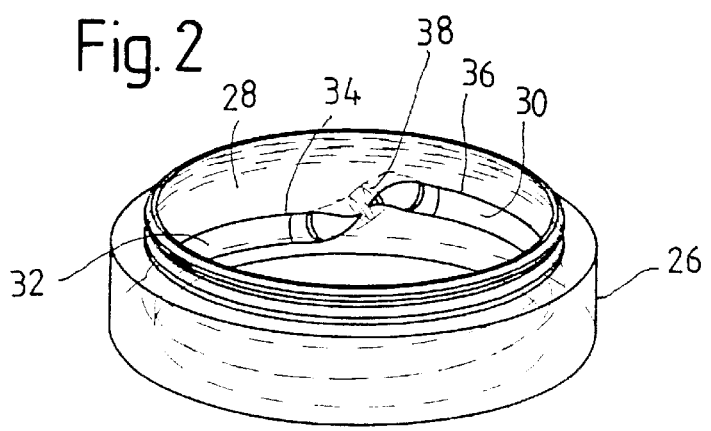
FIG. 2 is a perspective view of a nut element used in the clutch operator arrangement shown in FIG. 1.

A nut element 26, which on an inner circumferential surface 28, as can also be seen in FIG. 2, has a second groove arrangement 30, which in the exemplary embodiment illustrated comprises a thread 32 with approximately a single turn, is arranged so as to surround the spindle element 14 on the radially outer side. The two end regions 34, 36 of the thread 32 are connected to one another via a ball-return section 38 which leads radially away from the inner circumferential surface 28, so that ultimately it is possible to provide an endless series of balls formed by balls 40 which are arranged immediately following one another in the thread 32. The balls which are not in the ball-return section 38 then engage both in the first groove arrangement 22 and in the second groove arrangement 30 and serve to provide a rotatable coupling between spindle element 14 and nut element 26.

Since in this case, therefore, the thread 32 of the second groove arrangement 30 is substantially completely filled with balls 40, the individual balls 40, which immediately follow one another in the circumferential direction, can rub against one another, which would lead to undesirable sliding friction losses. This can be reduced by lubrication and/or by arranging spacer elements between each pair of load-transmitting balls 40 which are formed, for example, from steel. These spacer elements may comprise, for example, smaller ball elements which may, for example, be elastic and/or may be formed from low-friction material.

Furthermore, it should be noted that, of course, the groove arrangement 22 and, correspondingly, the groove arrangement 30 may also have a plurality of threads. It would also be possible for the second groove arrangement 30 to have a thread 32 with more than only a single turn.

If, with the spindle element 14 held securely both axially and in terms of rotation, the nut element 26 is set in rotation about the axis of rotation A, the individual balls 40 roll inside the individual groove arrangements 22, 30, as described in more detail below, and force an axial displacement of the nut element 26. The relative rotation between the nut element 26 and the spindle element 14 can be generated, for example, by a drive arrangement, which is denoted overall by 42 in FIG. 1. In the exemplary embodiment illustrated, this drive arrangement comprises a lever element 44, which is mounted pivotably on a rivet or bolt element 46, specifically so that it can pivot about an axis which is approximately parallel to the axis of rotation A. The lever element 44 interacts in a driving manner with the nut element 26 by means of its radially inner lever section 48. For this purpose, the lever element 44, on its radially inner lever section 48, has an interaction section 52, which is designed, for example, with at least one projection 50 which engages in a corresponding recess 54 or recesses 54 on the outer circumference of the nut element 26. The projection 50 and the recess 54 are elongate in the direction of the axis of rotation A, so that in this case although circumferential driving interaction is present, the nut element 26 can also be moved in translation with respect to the axially stationary lever element 44, the circumferential driving interaction between the projection 50 or the projections 50 and the associated recesses 54 naturally being maintained during the axial translational movement of the nut element 26. The radially outer section, not shown in FIG. 1, of the lever element 44 may, for example, be acted on by a control element or a clutch pedal, if appropriate via a Bowden cable or other actuating force-transmitting arrangement.

The nut element 26 is coupled to a clutch release bearing, which is denoted overall by 56, and then, by means of this clutch release bearing 56, acts on a force accumulator 58 in its radially inner region 60. The clutch release bearing comprises a bearing outer shell 62, which is fixed at least in the axial direction with respect to the nut element 26 by means of a flange-like section 64 which protrudes radially inward, via a securing ring 66 which engages in an external circumferential groove or recess in the nut element 26. In this case, a bearing inner shell 68 bears axially against the radially inner region 60 of the force accumulator 58, which may be designed, for example, in the form of a diaphragm spring. Both bearing shells 62, 68 have dedicated ball races, along which a plurality of balls 72, which follow one another in the circumferential direction and are held together, for example, by a cage 70, can roll. The result is rotational decoupling between the force accumulator 58, which rotates in the driving state, and the nut element 26, which does not rotate, at least in the stationary state.

Figure 3:
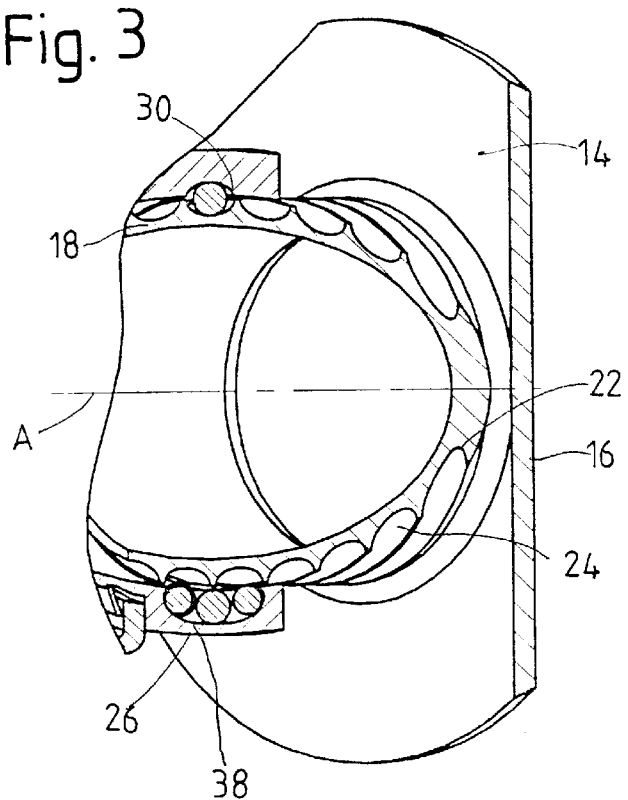
FIG. 3 is a sectional view of the clutch operator arrangement illustrated in FIG. 1, the section being taken in a plane which is inclined with respect to the axis of rotation.

The use of a clutch operator arrangement 10 as illustrated in particular in FIGS. 1 to 3 has the significant advantage that, with simple actuation and with a simple structural design, a relatively low actuating force, which is input via the lever element 44, by suitable selection of the lead of the threads 24, 32 can be converted into a relatively high actuating force, which then acts on the force accumulator 58. The multiplicity of balls 40 which lie in the two groove arrangements 22, 30 means that a force-transmitting interaction between the spindle element 14 and the nut element 26 which is uniformly distributed over the circumference is nevertheless achieved.

Figure 4:
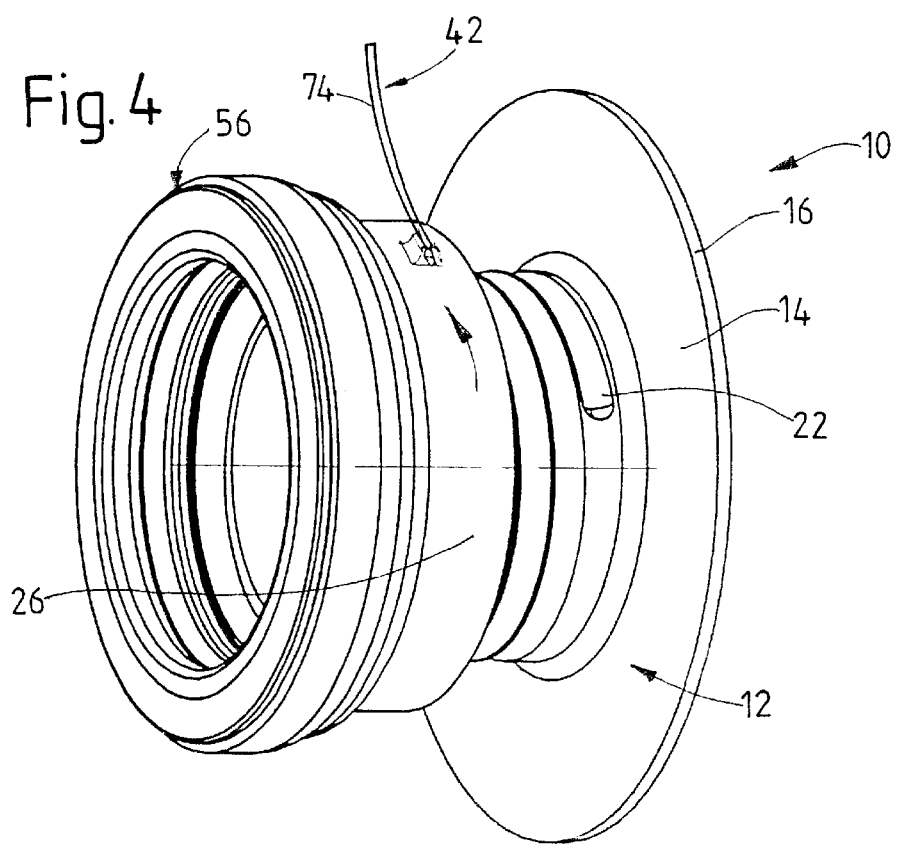
FIG. 4 is a perspective view of the clutch operator arrangement illustrated in FIG. 1 with an alternative type of actuation.

An alternative embodiment for introducing forces into the nut element 26 is illustrated in FIG. 4. It can be seen that in this case the drive arrangement 42 has a cable pull element 74, an end region of which is arranged on the nut element 26. The cable element 24 may, for example, be the core of a Bowden cable. One advantage of an embodiment of the drive arrangement 42 of this type is that ultimately direct coupling of the clutch operator arrangement 10 to a clutch pedal can be provided via a Bowden cable arrangement of this type, or if appropriate corresponding direct coupling to a control element is also possible. Furthermore, a drive arrangement 42 of this type allows a rotational movement of the nut element 26 over a relatively large rotation-angle range. One advantage of the drive arrangement with the lever element 44 which can be seen in FIG. 1 is that it can be used to produce adjustment movements with a high transmission of forces in both directions of actuation, while ultimately the cable element 74 can substantially only pull the nut element 26. In this case, the restoring force is provided substantially by the action of forces generated by the force accumulator 58.

Figure 5:
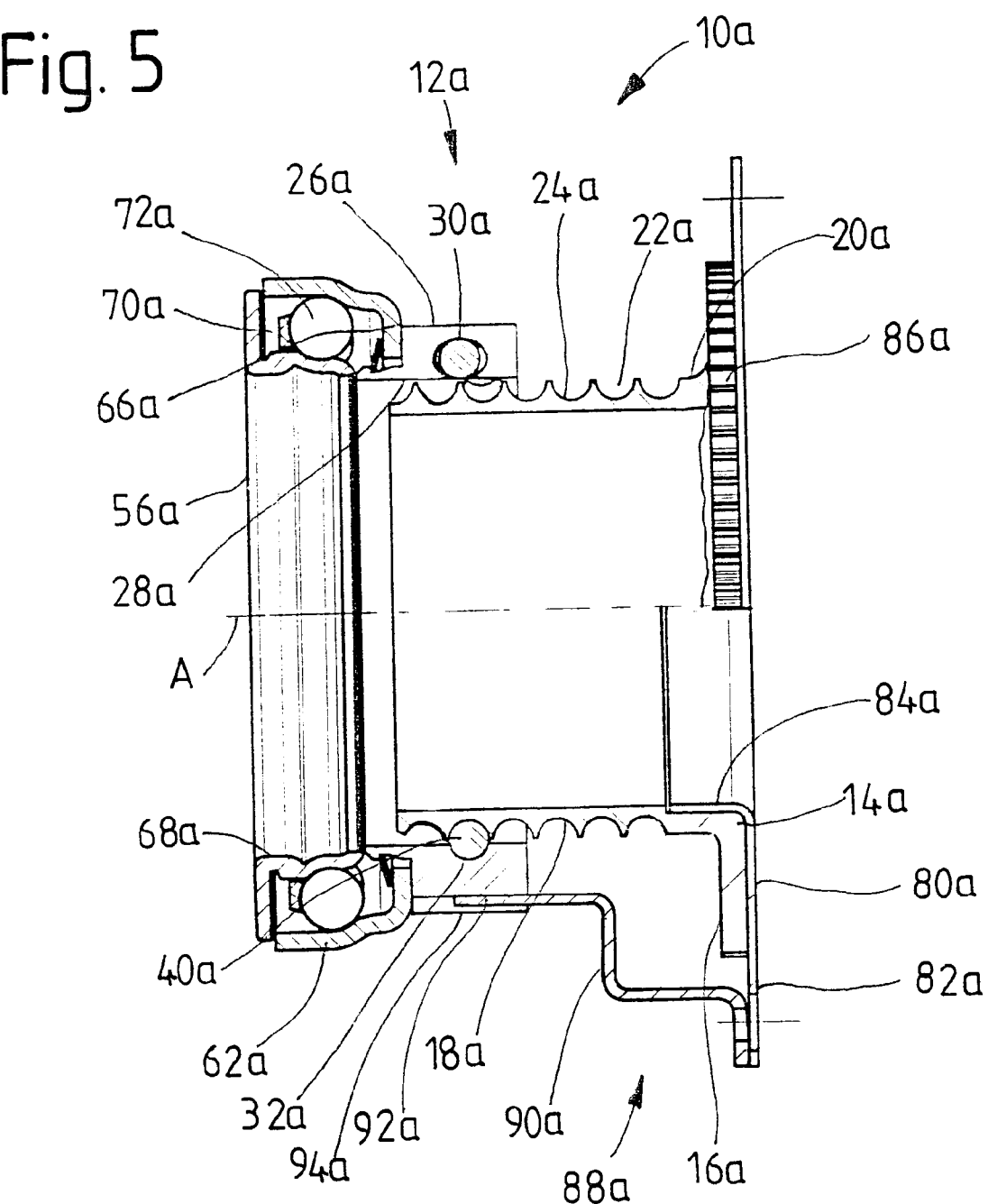
FIG. 5 is a view which corresponds to FIG. 1 of an alternative embodiment of the clutch operator arrangement according to the invention.

An alternative embodiment of the clutch operator arrangement according to the invention is illustrated in FIG. 5. Components which correspond to components which have been described above in terms of structure and/or function are denoted by the same reference numerals with the addition of a suffix "a".

The clutch operator arrangement 10a shown in FIG. 5 likewise comprises a ball screw 12a, which can be used with a pushed clutch, i.e. the actuating force exerted on the force accumulator (not shown in FIG. 5) via the nut element 26a and the clutch release bearing 56a is directed substantially away from the substantially stationary assembly (not shown in the figures) which, for example in the illustration shown in FIG. 5, would be provided adjacent to the right-hand side of the spindle element 14a.

In the embodiment shown in FIG. 5, the spindle element 14a is now arranged so that it can rotate about the axis of rotation A. For this purpose, as can be seen in the lower part of FIG. 5, a rotation-guiding element 80a is provided, which can then be fixed, by means of its flange-like section 82a, which projects radially outward, to the substantially stationary assembly and which engages axially, by means of a substantially cylindrical section 84a, in the spindle element 14a, i.e. its cylindrical section 18a, if appropriate with the interposition of a bearing, for example a sliding bearing sleeve or the like. Toothing 86a, which meshes with a mating toothed element, for example a gear wheel, rack or the like, and by means of which, therefore, the spindle element 14a can be driven to rotate about the axis of rotation A, is now provided on the outer circumferential region of the flange-like section 16a of the spindle element 14a. Since this embodiment too, as has already been described, is designed to generate an actuating force which is directed substantially away from the substantially stationary assembly, the spindle element 14a is always kept in steady bearing contact with the rotation-guiding element 80a by means of the reaction force of the force accumulator.

To ensure that, when the spindle element 14a is driven in rotation, the nut element 26a does not rotate with it, and therefore the desired axial displacement thereof can be generated, a rotational-movement blocking arrangement 88a is provided. This arrangement comprises, for example, one or more coupling elements 90a which, together with the rotation-guiding element 80a, can be fixed to the substantially stationary assembly and which engage, by means of a coupling section 92a, in a substantially axially extending recess 94a on the nut element 26a. Therefore, these coupling elements 90a hold the nut element 26a so that it cannot rotate about the axis of rotation A, but an axial translational movement of the nut element 26a in the direction of the axis of rotation A remains possible.

Figure 6:
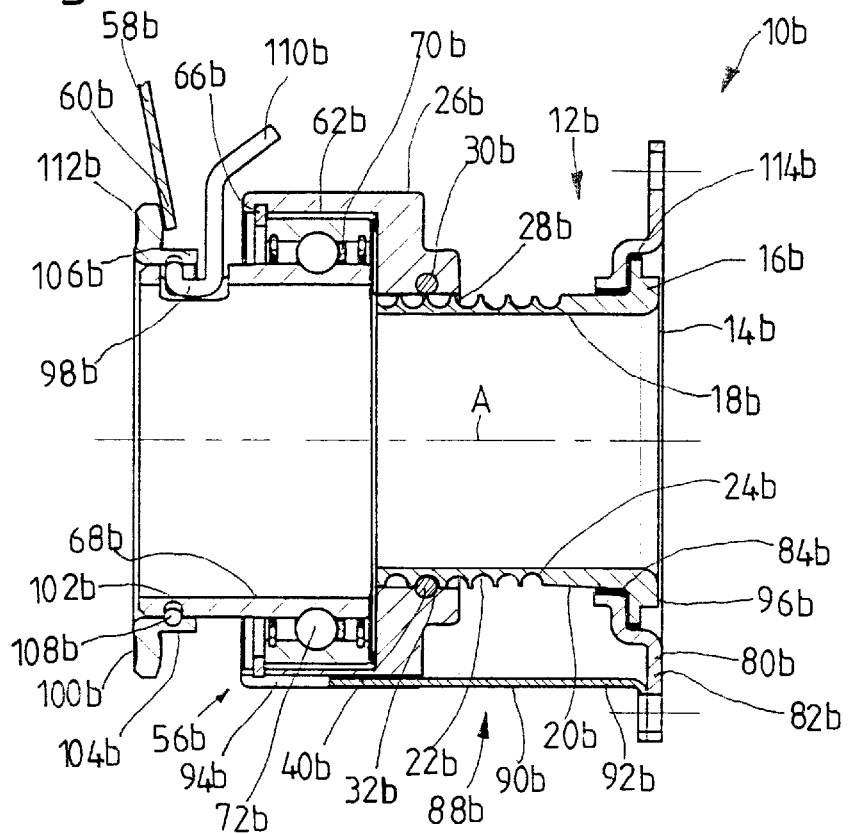
FIG. 6 is a further view, corresponding to that shown in FIG. 1, of an alternative embodiment of the clutch operator arrangement according to the invention.
Figure 7:
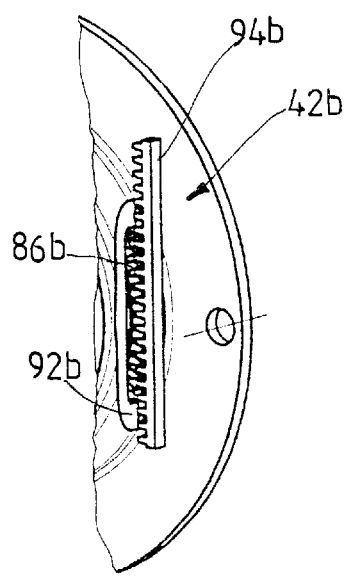
FIG. 7 is a fragmentary view of the clutch operator arrangement shown in FIG. 6, illustrating the nature of actuation of this arrangement.

A further embodiment of a clutch operator arrangement according to the invention is illustrated in FIGS. 6 and 7. Components which correspond to components which have been described above in terms of design and/or function are denoted by the same reference numerals with the addition of a suffix "b".

While the clutch operator arrangements 10; 10a described above were designed for connection to clutches of the pushed type, FIGS. 6 and 7 show a design variant of a clutch operator arrangement 10b which is designed for use with clutches of the pulled type, i.e. an actuating force which is directed toward the substantially stationary assembly, i.e. for example the transmission, is exerted on a clutch of this type or its force accumulator. In the design variant illustrated in FIG. 6, the spindle element 14b is once again fixed against axial movement on the substantially stationary assembly, but is held so that it can rotate about the axis of rotation A. For this purpose, the rotation-guiding element 80b engages around the radially outwardly extending flange-like section 16b of the spindle element 14b, so that this section 16b is axially secured between a holding section 96b of the rotation-guiding element 80b and the substantially stationary component (not shown in FIG. 6), i.e. for example the transmission casing. In the radially outer region of its flange-like section 16b, the spindle element 14b once again, at least in regions, has toothing 86b. In a circumferential region, the rotation-guiding element 80b has an opening 92b which is elongate in the circumferential direction and via which the toothing 86b projects radially outward and meshes for interaction with a mating toothed element, in the exemplary embodiment illustrated a rack 94b, of the drive arrangement 42b. Therefore, a translational movement of the rack 94b leads to the rotational movement of the spindle element 14b about the axis of rotation A. This rotational movement of the spindle element 14b is then converted, by means of the balls 40b, into a linear translational movement of the nut element 26b, which in turn is blocked against rotation about the axis of rotation A by the rotational-movement blocking arrangement 88b, which may be of similar design to that illustrated in FIG. 5.

As can be seen from FIG. 6, the nut element 26b is coupled so that it is fixed at least in the axial direction, by means of the securing ring 66b, to the bearing outer shell 62b. The bearing inner shell 68b is coupled so that it is fixed in the axial direction, by means of a connecting element 98b designed as an elastic wire ring, to an annular action element 100b. For this purpose, the bearing inner shell 68b has, on its outer circumferential region, a groove-like indentation 102b, which runs continuously in the circumferential direction and on the radially outer side lies opposite a corresponding indentation 104b on a cylindrical section 106b of the action element 100b. The connecting element 98b engages, by means of a circular section 108b extending around the axis of rotation A, in these two indentations 102b, 104b, being prestressed radially outward on account of its elastic prestressing and being supported on the radially outer side by the base of the indentation 104b. In both its circumferential end regions, the connecting element 98b has respective actuating sections 110b, only one of which is illustrated in FIG. 6. If these two actuating sections 110b, which are positioned so as to follow one another in the circumferential direction, are pressed against one another, i.e. moved toward one another, the diameter of the circular section 108b is reduced, with the result that this section is completely accommodated in the radially inner indentation 102b and therefore the action element 100b is released and can be removed in the axial direction from the bearing inner shell 68b.

By means of a radially outwardly projecting, for example flange-like section 112b, the action element 100b engages behind the radially inner region 60b of the force accumulator 58b and can therefore pull on the force accumulator 58b with an actuating force directed toward the substantially stationary assembly.

Since, in this embodiment, during the pulling action on the force accumulator 58b a relatively strong sliding friction interaction is generated between the section 16b of the spindle element 14b and the rotation-guiding element 80b, it is advantageous for a bearing element 114b which is of approximately sleeve-like design and is made from sliding-bearing material to be introduced between these two elements, in order to minimize the friction losses. By means of this bearing element 114b, ultimately the entire ball screw 12b is also centered with respect to the axis of rotation A.

As in the embodiments described above, the ball screw 12b illustrated in FIG. 6 or the clutch operator arrangement 10b can be prefitted to the transmission casing during assembly of a drive system and can then be integrated into the overall system together with the transmission. Particularly in the embodiment shown in FIG. 6, the coupling connection produced by means of the connecting element 98b could also be provided between the rotation-guiding elements 80b and a further element fixed to the transmission casing.

As has already been discussed above, to generate an actuating force, the nut element is rotated and, in the process, moved in translation in the axial direction relative to the spindle element. This is fundamentally also possible in such a manner that the nut element is fixed in the axial direction, for example to the transmission wall, and in such a manner that the axial translational movement occurring during the relative rotation is then present on the part of the spindle element, which is then the element which acts on the force accumulator.

Irrespective of which element out of the nut element and spindle element is moved in translation in the axial direction, when the relative rotation between these two elements occurs, the balls execute a rolling movement in the associated groove arrangements. This fundamentally causes the problem that the balls on the nut element are rolling along a surface region which is at a greater radial distance ($D_a$ in FIG. 9) from the axis of rotation A than a corresponding rolling-surface region along which the balls are able to roll in the groove arrangement of the spindle element. Based on a predetermined number of revolutions of the individual balls about respective ball axes of rotation D, this means that ultimately a sliding state would arise in at least one of these rolling-surface regions, since the same ball would have to cover different rolling distances on the two rolling-surface regions. According to a further aspect of the present invention, the two groove arrangements are designed or adapted to one another in such a manner that the occurrence of sliding movements of this nature on the part of the balls is substantially avoided. This is described below with reference to FIGS. 8 to 10, which diagrammatically depicts a ball screw 210 which is configured with special profiling of the groove cross sections. This type of specific design of the groove profiles could be used in all the embodiments of the clutch operator arrangement according to the invention which have been described above.

The ball screw 210 illustrated in FIGS. 8 to 10 once again comprises the spindle element 212, which has the first groove arrangement 216 on its outer circumferential surface 214. This groove arrangement 216 comprises, by way of example, a thread 218 with a plurality of turns. Once again, the nut element 220, which on its internal circumferential surface 222 has the second groove arrangement 224 with a thread 226, is provided so as to surround the spindle element 212 on the radially outer side. The balls 228 once again engage in the groove arrangements 216, 224.

Figure 10:
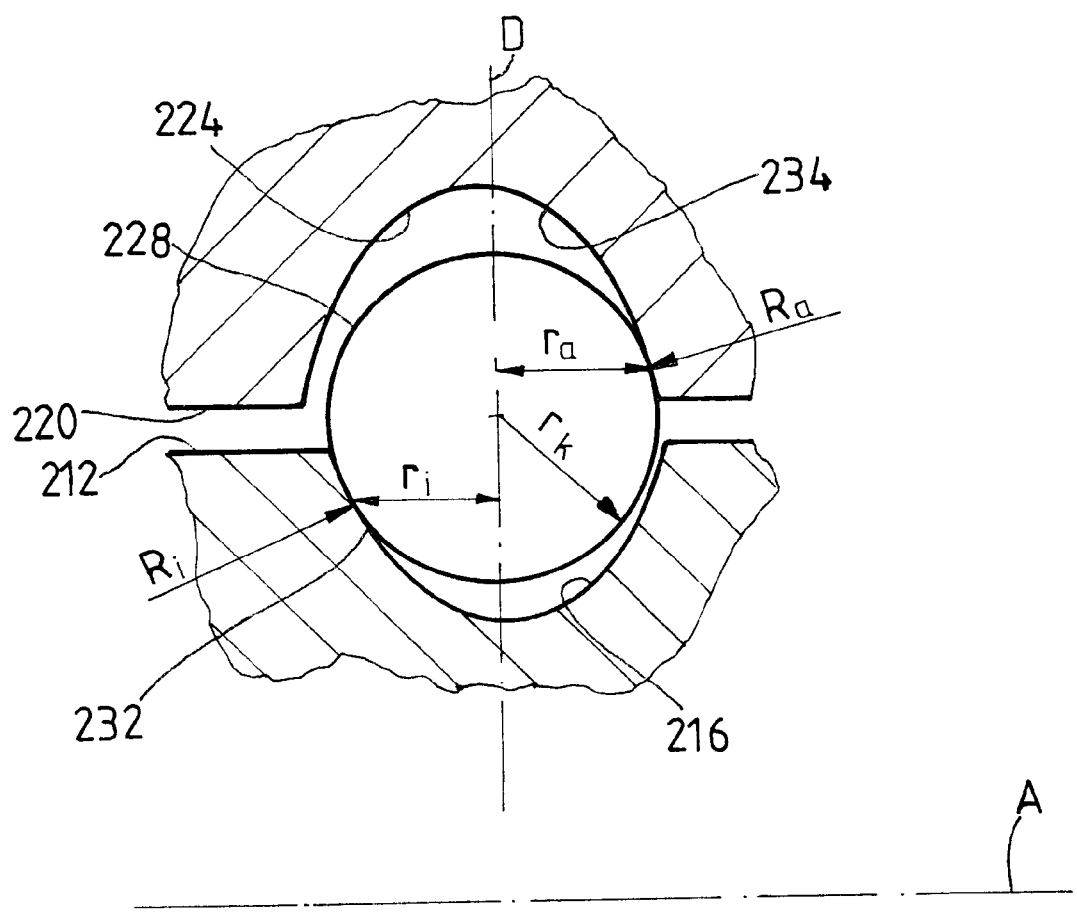
FIG. 10 is an enlarged fragmentary view of a portion taken from FIG. 9, illustrating the geometry of ball tracks.

FIGS. 9 and 10 show the cross-sectional profile with respect to a longitudinal direction of the respective threads 218 or 226 or groove arrangements 216, 224. It can be seen that both in the first groove arrangement 216 and in the second groove arrangement 224, a cross-sectional profile which is approximately oval or elliptical is provided, in which the radius of curvature R at the opening region of the respective groove arrangements 216, 224 is greater than the radius of curvature r in the region of the groove base 230. In particular, this radius of curvature r is also smaller than the radius $r_K$ of the balls 228. The result is that the balls 228 cannot come into contact with the groove base 230 and therefore a chamber region is formed, in which dirt can accumulate without this leading to increased rolling resistance.

In FIG. 9, those surface regions of the first groove arrangement 216 and of the second groove arrangement 224 with which the balls 228 come into contact when executing a movement conversion and therefore also when loads or forces are acting in the direction of the axis of rotation A are denoted by 232 and 234, respectively. It can be seen that the rolling-surface region 232 on the spindle element 212 is at a shorter distance D, from the axis of rotation A than the rolling-surface region 234 with which the balls 228 are in contact on the nut element 220. If the nut element 220 rotates, with respect to the spindle element 212, about the axis of rotation A, this bearing contact in the rolling-surface regions 232, 234 causes the axially clamped balls 228 to rotate about respective ball axes of rotation D, which are approximately at right angles to the axis of rotation A or, in the illustration shown in FIG. 10, are tilted slightly in the anticlockwise direction about the ball center point $K_M$.

It can be seen in FIG. 10 that the two groove arrangements 216 and 224 are designed with a cross-sectional profile which is such that the radius of curvature $R_1$ of the cross-sectional profile of the first groove arrangement 216 in the associated rolling-surface region 232 is smaller than the corresponding radius of curvature $R_a$ of the nut element 220 in the rolling-surface region 234. As a result, that region by means of which the balls 228 are in contact with the rolling-surface region 232 of the spindle element 212 will be at a shorter distance $r_1$ from the ball axis of rotation D than is the case in the region which lies further outward, where the distance $r_a$ between the ball axis of rotation D and the surface region of the ball 228 which is in contact with the rolling-surface region 234 is present. Another consequence is that the rolling movement in the first groove arrangement 216 is shifted slightly further inward toward the groove base than will be the case with the second groove arrangement 224.

If the ball 228 shown in FIG. 10 now rotates about its associated ball axis of rotation D, then, for example for a single revolution of the ball 228 about this ball axis of rotation D, the section of the ball 228 which lies further inward in the radial direction will have covered a shorter rolling distance, namely a rolling distance which is related to the effective rolling radius $r_i$, than is the case in the radially outer region, where the ball will roll along the second groove arrangement 224 using the larger effective rolling radius $r_a$. In this way, it is possible to compensate for the fact that, in the event of relative rotation between the nut element 220 and the spindle element 212 over a predetermined rotation angle which could, for example, once again correspond to a single ball revolution about the ball axis of rotation D, the ball 228 has to move slightly further on the groove arrangement 224 which lies further outward in the radial direction—with respect to the axis of rotation A—than will be the case in the spindle element 212, which lies further inward in the radial direction. In this way, the ball 228 can execute a rolling movement which is substantially free of sliding both with respect to the nut element 220 and with respect to the spindle element 212.

Therefore, in the ball screw 210 according to the invention, by suitably adapting the cross-sectional profiles of the two groove arrangements 216, 224, it is possible to ensure that, by means of the different radii of curvature $R_1$ and $R_a$, there are different effective rolling radii $r_1$ and $r_a$, which are in substantially the same ratio with respect to one another as the radial distances $D_1$ and $D_a$ of the rolling-surface regions 232 and 234. Cross-sectional profiles of this type can be obtained, for example, by designing the cross-sectional profiles, starting from the end region which is open toward the radially outer side or toward the radially inner side, with a radius of curvature which falls toward the groove base; in the case of the radially inner cross-sectional profile, i.e. the cross-sectional profile of the first groove arrangement 216, either simply a smaller starting value is used for the radius of curvature, or the rate of change of the radius of curvature is greater than that used in the second groove arrangement 224, which lies on the radially outer side.

FIG. 9 also shows that, as a result of the profiling of the groove arrangements 216, 224 with the different radii of curvature R and r in the opening region or in the region of the groove base 230, and as a result of the fact that in the region of the groove base 230 the radius of curvature r is smaller than the ball radius $r_K$, in the vicinity of the groove base 230 a spatial region is created which the balls 228 are unable to enter. Dirt can collect in these regions without the rolling properties of individual balls being impaired as a result.

Furthermore, it is also pointed out that in the ball screw according to the invention, as has been described above in various embodiments, it is also possible to implement a very wide range of modifications. By way of example, it is possible for stripper elements to be provided on the spindle element or on the nut element, which stripper elements engage in the respectively other groove arrangement, where they contribute to the removal of contamination. A complete covering by means of bellows which act between the nut element and the spindle element can also prevent contamination from penetrating into the groove arrangements.

The materials used for the spindle element and/or the nut element may, for example, be metals or plastics. These components can be produced by machining or can be injection-molded or cast in the intended shape, for example.

The present invention proposes a clutch operator arrangement which, while having a relatively simple structure and being of short design in particular in the axial direction, enables relatively great actuating forces to be generated, and in particular the use of the groove geometry according to the invention enables the frictional forces occurring within the clutch operator arrangement to be minimized further.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch operator arrangement for introducing an actuating force into a friction clutch, comprising a ball screw arrangement, wherein the ball screw arrangement includes:

a spindle element, said spindle element having a first groove arrangement on an outer circumferential surface thereof;

a nut element surrounding the spindle element, said nut element having a second groove arrangement on an inner circumferential surface thereof;

a plurality of balls, at least some of said balls engaging into said first groove arrangement and into said second groove arrangement, said spindle element being relatively rotatable about an axis of rotation with respect to said nut element so that said balls roll in said first groove arrangement and said second groove arrangement while at the same time rotating about respective ball axes of rotation during the relative rotation of said spindle element and said nut element, wherein, based on said ball axes of rotation, an effective ball-rolling radius with which said balls roll along said first groove arrangement is smaller than an effective ball-rolling radius with which said balls roll along said second groove arrangement, said spindle element being fixedly supported on a substantially stationary assembly so that said spindle is fixed with respect to rotation relative to said axis of rotation, said nut element acting on a bearing acting on a force accumulator of said friction clutch; and a drive arrangement engageable with said nut element for rotating said nut element about said axis of rotation for producing a relative displacement between said nut element and said spindle element in the direction of said axis of rotation.

2. The clutch operator arrangement according to claim 1, wherein said drive arrangement comprises a cable pull element engaging said nut element.

3. The clutch operator arrangement according to claim 1, wherein the drive arrangement is supported on said stationary assembly.

4. The clutch operator arrangement according to claim 1, wherein said first groove arrangement includes at least one first thread having plural turns, said second groove arrangement including at least one second thread associated with each first thread of said first groove arrangement, said at least one second thread having at least one turn, said at least one turn including turn end regions, said turn end regions being connected together with a ball return section.

5. The clutch operator arrangement according to claim 1, wherein said nut element acts on the friction clutch with an actuating force which is directed substantially away from said stationary assembly.

6. The clutch operator arrangement according to claim 1, wherein said first groove arrangement includes a first rolling-surface region, and said second groove arrangement includes a second rolling-surface region, said balls being arranged to roll on said first and second rolling-surface regions and simultaneously rotate about said respective ball axes of rotation, wherein said balls contact said first rolling-surface region with a first ball surface region and said second rolling-surface region with a second ball surface region at least during rolling movement, said first ball surface region being a shorter distance from said ball axis of rotation than said second ball surface region.

7. The clutch operator arrangement according to claim 6, wherein said first groove arrangement has a groove cross-sectional profile with a first surface radius of curvature in said first-rolling surface region, the second groove arrangement has a cross-sectional profile with a second surface radius of curvature in said second rolling-surface region, and said first surface radius of curvature is smaller than said second surface radius of curvature.

8. The clutch operator arrangement according to claim 1, wherein said first groove arrangement and said second groove arrangement have a respective groove cross-sectional profile with a surface radius of curvature decreasing from a groove opening region to a groove bottom.

9. The clutch operator arrangement according to claim 8, wherein said surface curvature radius in said groove bottom of at least one of said first groove arrangement and said second groove arrangement is smaller than a radius of said balls.

10. A friction clutch, said friction clutch including a force accumulator and embodying a ball screw clutch operator arrangement for actuating the force accumulator, said ball screw arrangement comprising:

a spindle element, said spindle element having a first groove arrangement on an outer circumferential surface thereof;

a nut element surrounding the spindle element, said nut element having a second groove arrangement on an inner circumferential surface thereof;

a plurality of balls, at least some of said balls engaging into said first groove arrangement and into said second groove arrangement, said spindle element being relatively rotatable about an axis of rotation with respect to said nut element so said balls roll in said first groove arrangement and said second groove arrangement while at the same time rotating about respective ball axes of rotation during relative rotation of said spindle element and said nut element, wherein, based on said ball axes of rotation, an effective ball-rolling radius with which said balls roll along said first groove arrangement is smaller than an effective ball-rolling radius with which said balls roll along said second groove arrangement, said spindle element being fixedly supported with respect to rotation on a substantially stationary assembly, and said nut element acting on a bearing acting on the force accumulator of the friction clutch, said nut element being rotatably driveable about said axis of rotation for producing a relative displacement between said nut element and said spindle element in the direction of said axis of rotation.

* * * * *